United States Patent
Willsie et al.

(10) Patent No.: US 8,715,188 B2
(45) Date of Patent: May 6, 2014

(54) MEDICAL DIAGNOSTIC ULTRASOUND SCANNING AND VIDEO SYNCHRONIZATION

(75) Inventors: Todd D. Willsie, Seattle, WA (US); William M. Derby, Jr., Bethlehem, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1033 days.

(21) Appl. No.: 11/827,761

(22) Filed: Jul. 12, 2007

(65) Prior Publication Data

US 2009/0018441 A1 Jan. 15, 2009

(51) Int. Cl.
*A61B 8/00* (2006.01)
*G01N 29/44* (2006.01)
*G09G 5/36* (2006.01)
*H04N 7/18* (2006.01)

(52) U.S. Cl.
USPC ........... 600/443; 600/437; 345/545; 345/560; 348/77; 73/620

(58) Field of Classification Search
USPC ............. 600/437, 443; 348/77; 345/545, 560; 73/620
See application file for complete search history.

(56) References Cited

U.S. PATENT DOCUMENTS

| | | | |
|---|---|---|---|
| 4,317,370 A | 3/1982 | Glenn | |
| 5,406,306 A * | 4/1995 | Siann et al. | 345/546 |
| 5,573,001 A | 11/1996 | Petrofsky et al. | |
| 5,579,028 A * | 11/1996 | Takeya | 345/641 |
| 6,106,467 A * | 8/2000 | Shimizu | 600/443 |
| 6,350,238 B1 * | 2/2002 | Olstad et al. | 600/437 |
| 6,605,042 B2 * | 8/2003 | Dong et al. | 600/447 |
| 7,009,561 B2 | 3/2006 | Menache et al. | |
| 2002/0102023 A1 * | 8/2002 | Yamauchi | 382/199 |
| 2002/0158814 A1 * | 10/2002 | Bright et al. | 345/7 |
| 2003/0036701 A1 * | 2/2003 | Dong et al. | 600/437 |
| 2004/0002652 A1 | 1/2004 | Phelps et al. | |
| 2004/0227716 A1 * | 11/2004 | Lin | 345/99 |
| 2005/0228281 A1 * | 10/2005 | Nefos | 600/446 |
| 2006/0116578 A1 * | 6/2006 | Grunwald et al. | 600/440 |
| 2006/0192741 A1 * | 8/2006 | Hirakawa et al. | 345/98 |
| 2007/0078342 A1 * | 4/2007 | Jago | 600/443 |
| 2007/0112266 A1 * | 5/2007 | Kishimoto | 600/437 |
| 2007/0123110 A1 * | 5/2007 | Schwartz | 439/638 |
| 2007/0276236 A1 * | 11/2007 | Jong | 600/437 |
| 2008/0269610 A1 * | 10/2008 | Burla et al. | 600/447 |
| 2008/0281206 A1 * | 11/2008 | Bartlett et al. | 600/459 |

FOREIGN PATENT DOCUMENTS

EP 0 388 215 B1 10/1995

OTHER PUBLICATIONS

Office Action in counterpart Chinese application No. 200810135802. 8, filed Jul. 14, 2008, dated Jun. 24, 2011. 18 pages total.

* cited by examiner

*Primary Examiner* — Long V. Le
*Assistant Examiner* — Angela M Hoffa

(57) ABSTRACT

Real-time scanning and display of images is synchronized for ultrasound imaging. The scanning rate requirements for obtaining a frame of ultrasound data are determined. The video rate for imaging is adjusted as a function of the scanning rate.

3 Claims, 1 Drawing Sheet

MEDICAL DIAGNOSTIC ULTRASOUND SCANNING AND VIDEO SYNCHRONIZATION

BACKGROUND

The present embodiments relate to timing of displayed images and scanning. The video frame rate output by many ultrasound imaging systems is fixed. For example, images are output at 30 Hz or 60 Hz to simplify the conversion to NTSC standard video signals required by videocassette recorders. Matching the video frame rate to the frame rate used in common applications simplifies recording ultrasound scans. Off-the-shelf parts may be used for the video generation in the ultrasound system as well.

To accommodate the fixed video frame rate, the acoustic frame rate is set at a fixed integer ratio with the video frame rate. The transmit and receive beamformation scan rate is fixed. The ratio may be a non-integer ratio in some systems. A large buffer memory is used for frame rate conversion from the acoustic frame rate to the video frame rate. However, the buffer memory and processing overhead for rate conversion may be undesired due to cost, size, and/or power requirements.

BRIEF SUMMARY

By way of introduction, the preferred embodiments described below include methods, systems, instructions, and computer readable media for real-time scanning and display of images. The scanning rate requirements for obtaining a frame of ultrasound data are determined. The video rate for imaging is adjusted as a function of the scanning rate.

In a first aspect, a medical diagnostic ultrasound imaging system is provided for real-time scanning and display of images. A beamformer is operable to receive beamform ultrasound information. A display is operable to display ultrasound images at a first frame rate. The display is operable to adjust the first frame rate as a function of operation to receive beamform the ultrasound information.

In a second aspect, a method is provided for real-time scanning and display of ultrasound images. A region is scanned with ultrasound. Images are generated with ultrasound information. A frame rate of the images is synchronized with the scanning.

In a third aspect, a computer readable storage medium has stored therein data representing instructions executable by a programmed processor for real-time scanning and display of ultrasound images. The storage medium includes instructions for displaying images at a first frame rate, generating transmit beams of acoustic energy, forming data representing receive beams, and timing the first frame rate as a function of time to perform the generating and forming.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Video frame rate is synchronized with ultrasound transmit and beamforming events. The video display frame rate is changed to match the requirements of an acoustic frame or scanning rate. The video and acoustic frame rates are matched or directly synchronized. The acoustic frame rate may vary depending on the number of beams, depth of scan and pulse repetition frequency. As a result, the synchronized video frame rate may vary depending on these parameters.

Figure 1:
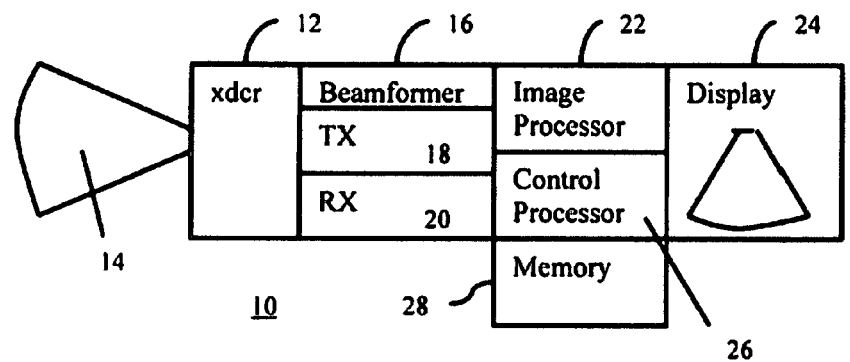
FIG. 1 is a block diagram of one embodiment of an ultrasound imaging system for real-time scanning and display of images.

FIG. 1 shows one embodiment of a medical diagnostic ultrasound imaging system 10 for real-time scanning and display of images. Any ultrasound imaging system 10 may be used. In one embodiment, the system 10 is a cart based imaging system. In another embodiment, the system 10 is a portable system, such as a briefcase-sized system or laptop computer based system. Other embodiments include handheld ultrasound systems. For example, one or more housings are provided where the entire system is small and light enough to be carried in one or both hands and/or worn by a user. The system may have any weight, such as a handheld system weighing less than 6 pounds. In one embodiment, the system weighs 2 or less than 2 pounds to minimize strain in carrying the system by a medical professional. A battery powers the system, and small-scale circuits, such as integrated circuits implement the electronics. In another example, a transducer is in one housing to be held by a person, and the imaging components and display are in another housing to be held by a person. Coaxial cables connect the two housings. A single housing for an entire handheld system may be provided.

The system 10 includes a transducer 12, a beamformer 16, an image processor 22, a display 24, a control processor 26, and a memory 28. Additional, different, or fewer components may be used. For example, a cable connects the transducer 12 to the beamformer 16, and/or a cable connects part of the display 24 (e.g., monitor or LCD) to another part of the display 24 (e.g., video card) or the image processor 22. The image processor 22 and control processor 26 may be combined as one processor or group of processors, or maintained separate as shown.

The elements connect directly to the beamformer 16. Alternatively, multiplexers provide for aperture control to connect elements to different channels at different times. To reduce a number of cables, the number of connections from the elements to the beamformer 16 may be reduced. Time multiplexing, frequency multiplexing, sub-array mixing, partial beamforming or other processes for combining signals may be used. For example, signals from groups of four or other numbers of elements are combined onto common data paths by sub-array mixing, such as disclosed in U.S. Pat. No. 5,573,001 or U.S. Published Application No. 20040002652, the disclosures of which are incorporated herein by reference.

The transducer 12 is an array of elements. Any array may be used, such as a linear, phased, curved linear, or other now known or later developed array. Any number of elements may be used, such as 64, 96, 128, or other numbers. One, two, or other multi-dimensional (e.g., 1.25, 1.5, or 1.75) arrays may be provided. The elements are piezoelectric or capacitive membrane elements.

In response to signals from the beamformer 16, the transducer 12 generates acoustic beams. The acoustic beams are focused to different locations to scan a two or three-dimensional region 14. The scan format is linear, sector, Vector®, or other now known or later developed scan format. The scan format includes a set or programmable number of beams within the region 14, such as 50-150 beams. The depth of the region 14 may be set or programmable.

The transmit portion 18 of the beamformer connects with electrodes on one side of the elements, and the receive portion 20 of the beamformer 16 connects with electrodes on an opposite side of the elements. Passive or active switching grounds the electrodes not being used, such as grounding transmit side electrodes during receive operation. Alternatively, the beamformer 16 connects to the transducer 12 through a transmit/receive switch.

The transmit and receive portions 18, 20 are formed in a same device or are separate. The transmit portion 18 is a transmit beamformer. The receive portion 20 is a receive beamformer.

The beamformer 16 is digital. For digital beamforming, analog-to-digital converters sample the signals from the elements and output element data to the beamformer 16.

The beamformer 16 is an application specific integrated circuit, processor, field programmable gate array, digital components, integrated components, discrete devices, or combinations thereof. In one embodiment, the transmit portion 18 includes a plurality of pulsers or waveform generators, such as transistors, and amplifiers. The transmit portion 18 generates electrical signals for different elements of the transducer 12. The electrical signals have relative amplitude and delays for generating an acoustic beam along one or more scan lines.

In one embodiment, the receive portion 20 includes a plurality of delays and one or more summers for relatively delaying electrical signals received from the transducer elements and summing the delayed signals. Amplifiers may be provided for apodization. In one embodiment, the delays are implemented as memories for storing channel data. One or more memories may be used. For example, two memories operate in a ping-pong fashion to store data from elements and read data out for beamforming. Each memory stores element data for an entire scan. As one memory is storing, the other memory is outputting. By reading data out of the memory from selected memory locations, data associated with different amounts of delay is provided. The same data may be used for sequentially forming receive beams along different scan lines. Other memories may be used, such as a plurality of first-in, first-out buffers for delaying based on length and/or timing of input into the buffers.

The beamformer 16 operates pursuant to control parameters. The control parameters indicate the scan format, the number of beams to scan an entire region (beam count), a depth of scan, a pulse repetition frequency, a sample frequency (e.g., analog-to-digital sample rate), apodization profile, number of focal points or transmissions along a given line, number of parallel transmit and/or receive beams, delay profile, waveform shape, waveform frequency, or other characteristic of scanning performed by the beamformer 16. For each transmission and corresponding reception, scan of a region, or other period, new control parameters may be loaded. For example, a table of control parameters is used to download to the beamformer 16. The control parameters to be downloaded are selected as a function of user or processor selection of scan information. In alternative embodiments, one, more or all of the parameters are fixed.

Loading the parameter for scanning takes time, such as a particular number of clock cycles. Performing the scan also takes time, such as time for acoustic energy to propagate to the deepest depth of the region 14 and echoes to return to the transducer 12. Depending on the configuration, different amounts of time may be needed to scan the region 14. For example, a higher beam count, deeper depth, lower pulse repetition frequency, number of beams per transmit or receive, or other control parameter may result in scanning taking a longer time.

The image processor 22 is a processor, detector, filter, scan converter, or combinations thereof. In one embodiment, the image processor 22 includes a B-mode and/or Doppler detectors. Intensity and/or motion information is detected from the receive beamformed information. Scan conversion converts from a scan format to a display format, such as from a polar coordinate format to a Cartesian coordinate format. Any now known or later developed image processor 22 and/or image processing may be used, such as an FPGA or application specific integrated circuit.

The display 24 is a video card, video buffer, processor, circuit, liquid crystal display, monitor, CRT, plasma screen, projector, printer, combinations thereof, or other now known or later developed display device. The display 24 receives scan converted ultrasound data and displays an image. For real-time ultrasound imaging, the display 24 receives frames of data and displays a sequence of ultrasound images each representing the region 14 or overlapping portions thereof. The sequence of ultrasound images are generated at a frame rate, such as 30 Hz or other rate. The rate is maintained or varies during the sequence.

In one embodiment, a buffer stores each frame of scan converted ultrasound data output from the image processor 22. A video processor outputs lines of display data in response to horizontal and/or vertical synchronization signals. The line synchronization signals trigger reading of the next row or column of information for display from the buffer. The first frame rate is responsive to the synchronization signal. More rapid video line synchronization signals provide a more rapid frame rate.

The display 24 is operable at different frame rates. The clock for reading out of the buffer or reading to the screen increases or decreases to alter the frame rate. Alternatively or additionally, holds or delays of different lengths are provided between reading pixels, lines or entire frames, such as delaying after or before every video line synchronization signal. Other hardware or software processes may be used for adjusting the frame rate.

The frame rate of the display 24 is adjusted as a function of operation of the beamformer 16. For example, the frame rate is adjusted to correspond to a scan rate or rate of operation for receive beamformation. The scan rate and the video frame rate are set equal, such that images are generated at a same rate as data for images is acquired. Other ratios may be used, such as generating the images at half or twice the scan rate (e.g., scan the region 14 once for each two images generated). Where the scan rate is slower (e.g., ½ the display frame rate), the same image may be generated twice.

The scan rate includes the time to configure the beamformer 16 with the control parameters, the time to transmit beamform based on the control parameters, and/or the time to receive beamform based on the control parameters. Additional, different, or fewer components may be included in the scan rate, such as including time to sequentially form multiple beams from the same received data. The scan rate may be based on the time to perform all operations to form a frame of beamformed data representing the entire region at a given time.

The control processor 26 is a general processor, digital signal processor, application specific integrated circuit, field programmable gate array, digital circuit, combinations thereof, or other now known or later developed control processor. The control processor 26 is separate from or the same as the image processor 22. In one embodiment, the control processor 26 is a single device. In other embodiments, the control processor 26 includes a plurality of devices, such as distributed processors. The control processor 26 may be part of the beamformer 16, such as the control processor 16 controlling the loading and configuration of the beamformer 16, and/or part of the display 24, such as the control processor 26 controlling the video frame rate. Alternatively, the control processor 16 controls beamforming and/or video control processors.

The control processor 26 determines beamformer operation timing and schedules the beamformer operation relative to the video frame rate. The loading of control parameters, transmit operation, and receive operation are scheduled. Based on the beamformer configuration, different amounts of time may be needed to scan the region 14 for a frame of data. The depth, beam count, and sample frequency may increase or decrease the amount of time needed to complete a scan. For example, a high sample frequency may over run the delay memory. Accordingly, multiple scans are performed with different focal depths (e.g., a near scan and a far scan) to scan the entire region 14 without over flowing the delay memory of the receive portion 20. As another example, scanning 60 scan lines takes less time that scanning 100 scan lines. In another example, scanning to 10 cm takes less time than scanning to 20 cm.

The video frame rate is adjusted to account for the time to complete the scanning schedule. The video frame rate is adjusted to be the same or substantially same as the scan rate. Alternatively, the video frame rate is adjusted to be at a desired ratio to the scan rate.

In one embodiment, the scheduled scanning tasks are scheduled relative to the video frame rate. For example, control parameters may be loaded in an amount of time to read out one line of video (e.g., between video line synchronization signals). Eight or other number of lines of video may be read out in the amount of time to transmit and receive in one event. Given hundreds of lines of data for an image and the corresponding hundreds of line synchronization signals, different scanning tasks are scheduled to occur with different video lines. The scheduled operations are performed to provide a complete scan in a desired number of video lines, such as sufficient lines for one or more complete images.

In one embodiment, the video line signal of the display 24 is received as an interrupt by the control processor 26 or a beamformer controller. This interrupt locks the scanning operation to the line synchronization of the display. Scanning, scanning configuration, overlay video, or other process is scheduled to occur based on the line synchronization, so the line synchronization triggers the next scanning task. Other synchronization triggers may be used, such as counting clock pulses or triggers output by the beamformer 16. For example, the video line synchronization signal is triggered based on completion of beamformer tasks in the schedule.

The memory 28 is a computer readable storage medium having stored therein data representing instructions executable by a programmed processor for real-time scanning and display of ultrasound images. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multi-processing, multitasking, parallel processing and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system. In another embodiment, the memory 28 is within a handheld ultrasound system with one or more housings. The handheld ultrasound system includes the beamformer 16 and the display 24.

Figure 2:
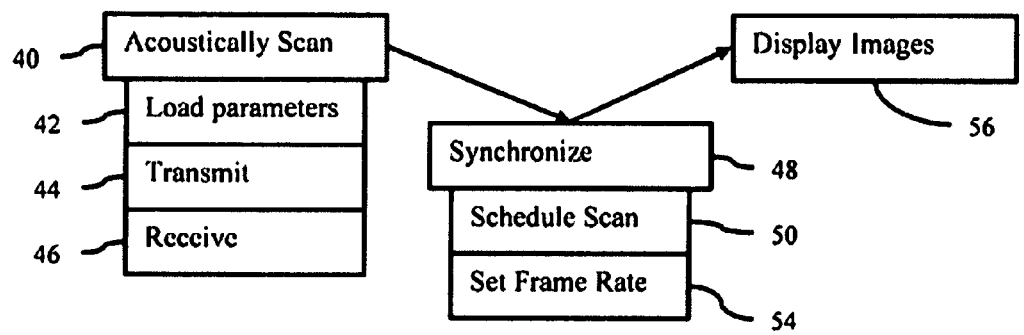
FIG. 2 is a flow chart diagram of one embodiment of a method for real-time scanning and display of ultrasound images.

FIG. 2 shows a method for real-time scanning and display of ultrasound images. The method is implemented by the system 10 of FIG. 1, a handheld system with one or more housings, or a different system. For example, the method, synchronization, scheduling or other acts are signal processing performed with custom digital logic implemented in field programmable gate arrays. The method is performed in the order shown or a different order. Additional, different, or fewer acts may be performed.

In act 40, a region is scanned with ultrasound. To scan, values of control parameters are loaded or calculated in act 42. The control parameters indicate the depth, scan format, number of beams, sample frequency, pulse repetition frequency, focal regions, combinations thereof, or other programmable beamforming characteristic. One or more characteristics may be fixed or not programmable.

After loading values for the control parameters, one or more transmit events are performed in act 44. The transmit event includes the generation of electrical signals. The electrical signals are converted by a transducer into acoustic energy. Based on the control parameters, the acoustic energy forms one or more beams. A plane wave or diverging wave may be formed in other embodiments.

One or more receive events are performed in act 46. In response to the transmit beam or beams of act 44, echoes impinge on the transducer. In the receive event, the echoes are converted to electrical signals by the elements. The electrical signals are beamformed. Relative delays and/or apodization are applied and the data summed. Data representing one or more receive beams is formed from the same electrical signals.

To scan an entire region, the transmit and receive events may be repeated. Alternatively, a plane wave is transmitted and all or groups of receive beams are formed in response to each transmission. For subsequent transmit and receive events, the same parameters may be used without further loading of control parameters. Alternatively, new parameters are calculated or loaded for each beam, group of beams, or portion of a scan. The scanning of act 40 is performed pursuant to a schedule of events. The schedule includes the needed loading, transmitting and receiving to scan a region. The region is an entire two or three-dimensional region for generating an image. Alternatively, the scheduling is performed for sub-regions less than the entire region to be scanned. The schedule may be repeated for a sequence of scans, such as until the user indicates different scanning to be performed (e.g., a different depth).

In act 56, images are generated with ultrasound information. Beamformed ultrasound data is detected, scan converted, or otherwise formed into image data. The image data is output for display. For real-time operation, the scanning of act 40 and the displaying of act 56 occur substantially simultaneously. Substantially accounts for data processing delays and pauses to load control parameters. Frames of beamformed data are sequentially and substantially continuously acquired by scanning in act 40. The frames of data after image processing are sequentially and substantially continuously displayed as images in the displaying of act 56. The displaying of the sequence occurs at a constant or variable frame rate.

The frame rate of the images is synchronized with the scanning in act 48. The frame rate of the displaying of act 56 is adjusted. The adjustment is based on the scan or acoustic rate, such as the time to perform the loading, generating and receive beamforming of the scanning in act 40. The display frame rate is a function of the scheduled beamforming activities. The display frame rate may be set for given scanning configuration and expected scan rate, but remain the same despite variance in the scan rate. Alternatively, as the scan rate varies, the display frame rate also varies.

In act 50, the scanning operations are scheduled. The schedule is calculated or determined prior to scanning of act 40 and/or in response to user input. The schedule is based on the scanning to be performed and the hardware used to perform the scanning. An amount of time to complete the scanning of the region is determined. The amount of time includes the loading of control parameters in act 42, the transmitting in act 44, and/or the receiving in act 46.

The schedule includes the various operations to occur for scanning. An amount of time needed for each operation is known or may be calculated. For example, the amount of time for transmitting and receiving is, at least in part, calculated based on the depth to be scanned. The load time for control parameters may be determined in advance from the hardware design or is assumed. Given the scan format, the number of beams to be formed is determined or known. The sample frequency may dictate multiple scanning of sub-regions (e.g., dual focal zones for each scan line). Doppler imaging may require multiple scans of the same scan lines. The operations to complete the scan are determined.

The operations are provided in a sequence and scheduled based on time. Any division may be used, such as cycles, clock counts, or time. In one embodiment, the operations are divided based on time for displaying each video line or between display synchronization signals.

In act 54, the video or display frame rate is set or mapped to the scan rate. The schedule indicates the time to complete a scan. The scan rate is determined from the time. The time to complete a scan is determined from the schedule. The frame rate of the display is set to be the same as the scan rate. The display frame rate is set to correspond to or provide sufficient time for performing the scanning of act 40. The images are of an entire region. The scan to provide data for the entire region is performed repetitively at an acoustic scan rate. The display frame rate is adjusted to be the same or substantially the same as the acoustic scan rate.

For real-time operation, the display is provided with frames of data at the rate at which the frames of data are acquired. Extra buffering or changing the scan rate may be avoided. The scan rate rather than display frame rate determines the rate of operation of the system.

In alternative embodiments, the acoustic scan rate is different than the display frame rate. The display frame rate is a function of the acoustic scan rate, but may be double or other integer multiple of the acoustic scan rate. For example, the same image is displayed two or more times to provide sufficient time to scan the entire region to be imaged in later displayed images. If the scan rate is 18 Hz, but the lowest acceptable display frame rate is 20 Hz, then the display frame rate is set to 36 Hz. At twice the scan rate, the newest available images are displayed when available, but each is displayed twice in succession.

The synchronization is provided by setting the video timing as a function of the schedule or time to complete the schedule. In one embodiment, the scheduled tasks are divided into stages corresponding to video line synchronization signals. Each task uses the time for one or more video lines to be output. The processor implements the acoustic scanning tasks based on the video line signals. As each video line signal or after a count of a certain number of video line signals is received, the next task in the schedule is implemented. In alternative embodiments, the scanning and display are not further synchronized other than the setting of the rates.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A medical diagnostic ultrasound imaging system for real-time scanning and display of images, the system comprising:
    a beamformer configured to receive beamform ultrasound information; and
    a display configured to display ultrasound images at a first frame rate;
    wherein the display is configured to adjust the first frame rate as a function of operation to receive beamform the ultrasound information and
    a processor configured to determine beamformer operation timing based on a beamform configuration and schedule beamformer operation based on the determined beamformer operation timing relative to the first frame rate, the first frame rate adjusted to account for completion of the schedule.

2. The system of claim 1 wherein the beamform operation is a function of depth, beam count, and sample frequency, and wherein the processor is configured to schedule beamformer operations relative to video lines.

3. The system of claim 1 wherein a video line signal of the display is configured to as an interrupt for the processor.

* * * * *